US012593135B2

(12) United States Patent
Yao et al.

(10) Patent No.: US 12,593,135 B2
(45) Date of Patent: Mar. 31, 2026

(54) PANORAMA CAMERA CONFIGURATION METHOD AND PANORAMA CAMERA CONFIGURATION SYSTEM

(71) Applicants: Inventec (Pudong) Technology Corp., Shanghai (CN); Inventec Corporation, Taipei (TW)

(72) Inventors: Chih-Yuan Yao, Taipei (TW); Sheng-Chang Ruan, Taipei (TW); Ren-Jie Lu, Taipei (TW); Hai-Jing Chu, Taipei (TW); Ke-Hao Huang, Taipei (TW); Chen-Yi Wu, Taipei (TW); Chao-Chia Lin, Taipei (TW); Min-Chia Chen, Taipei (TW); Wei-Chao Chen, Taipei (TW); Ghih-Pin Wei, Taipei (TW); Huei-Ru Fang, Taipei (TW); Shun-Wen Cho, Taipei (TW); Hsun-Chen Liu, Taipei (TW); Shih-Heng Peng, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 18/808,072

(22) Filed: Aug. 18, 2024

(65) Prior Publication Data

US 2025/0380059 A1 Dec. 11, 2025

(30) Foreign Application Priority Data

Jun. 11, 2024 (CN) .......................... 202410750081.0

(51) Int. Cl.
*H04N 23/698* (2023.01)
*G06T 15/00* (2011.01)
*G06V 20/56* (2022.01)

(52) U.S. Cl.
CPC ........... *H04N 23/698* (2023.01); *G06T 15/00* (2013.01); *G06V 20/56* (2022.01)

(58) Field of Classification Search
CPC ....... H04N 23/698; G06V 20/56; G06T 15/00
(Continued)

(56) References Cited

U.S. PATENT DOCUMENTS

2017/0264890 A1* 9/2017 Gorilovsky ............ G03B 37/04
2019/0272626 A1* 9/2019 Rhee ..................... G06T 15/506

FOREIGN PATENT DOCUMENTS

WO WO-2022100606 A1 * 5/2022 ........... H04N 9/3191

OTHER PUBLICATIONS

WO2022100606 Machine Translation; 2022.*

* cited by examiner

*Primary Examiner* — Nguyen T Truong
(74) *Attorney, Agent, or Firm* — Winston Hsu

(57) ABSTRACT

A panoramic camera configuration method for configuring a vehicle with a plurality of cameras includes obtaining a plurality of configuration parameters of the vehicle and a plurality of camera parameters of the plurality of cameras; utilizing a three-dimensional simulation software to establish a virtual environment image according to a plurality of environmental parameters of the environment around the vehicle; and obtaining a plurality of environment images corresponding to the plurality of cameras according to the virtual environment image, the plurality of environmental parameters, the plurality of configuration parameters and the plurality of camera parameters; obtaining a panoramic image according to the plurality of environmental images; and updating the plurality of configuration parameters and the plurality of camera parameters according to the virtual environment image and the panoramic image.

8 Claims, 6 Drawing Sheets

(58) Field of Classification Search
USPC .......................................................... 348/36
See application file for complete search history.

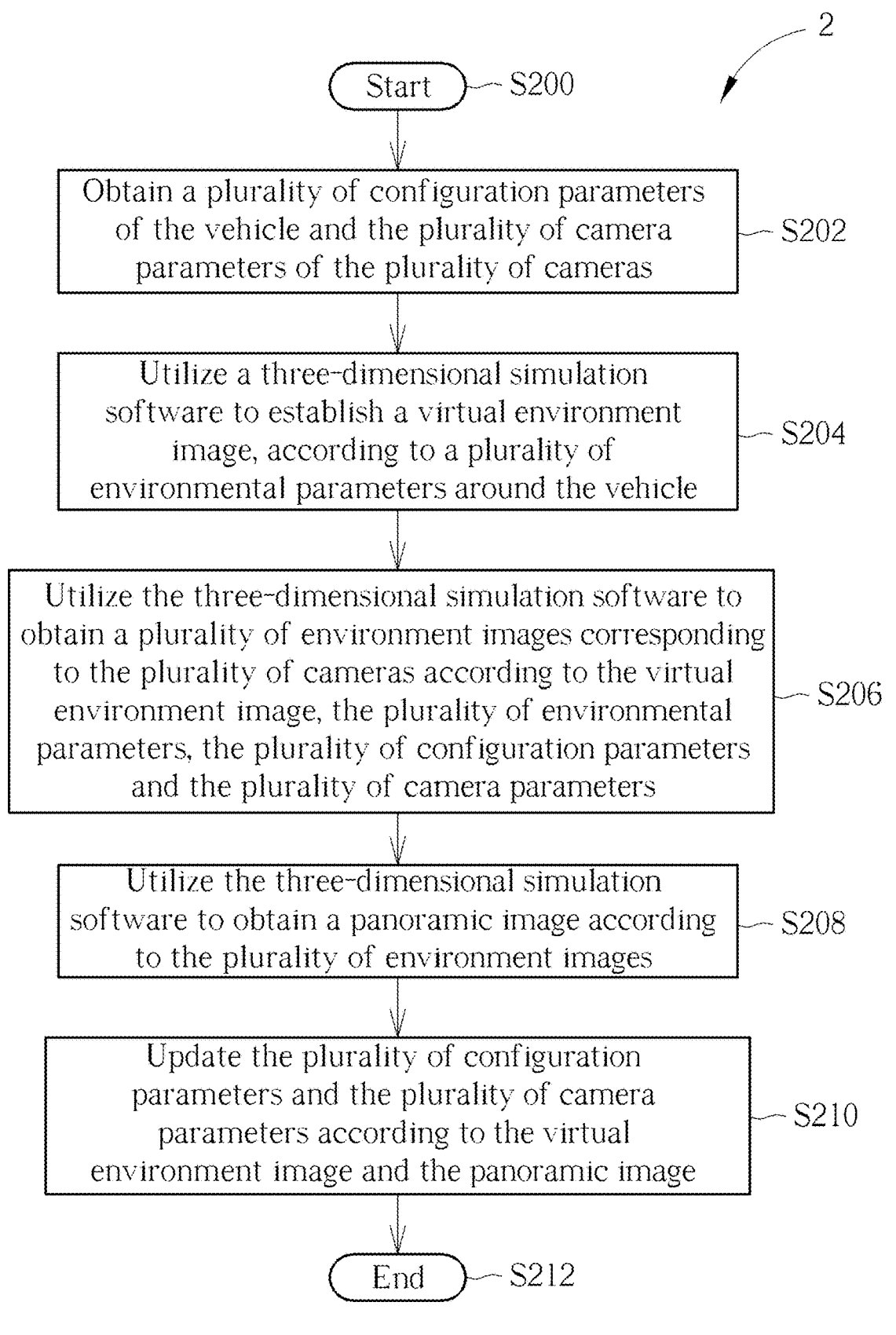

2

Start — S200

Obtain a plurality of configuration parameters of the vehicle and the plurality of camera parameters of the plurality of cameras — S202

Utilize a three-dimensional simulation software to establish a virtual environment image, according to a plurality of environmental parameters around the vehicle — S204

Utilize the three-dimensional simulation software to obtain a plurality of environment images corresponding to the plurality of cameras according to the virtual environment image, the plurality of environmental parameters, the plurality of configuration parameters and the plurality of camera parameters — S206

Utilize the three-dimensional simulation software to obtain a panoramic image according to the plurality of environment images — S208

Update the plurality of configuration parameters and the plurality of camera parameters according to the virtual environment image and the panoramic image — S210

End — S212

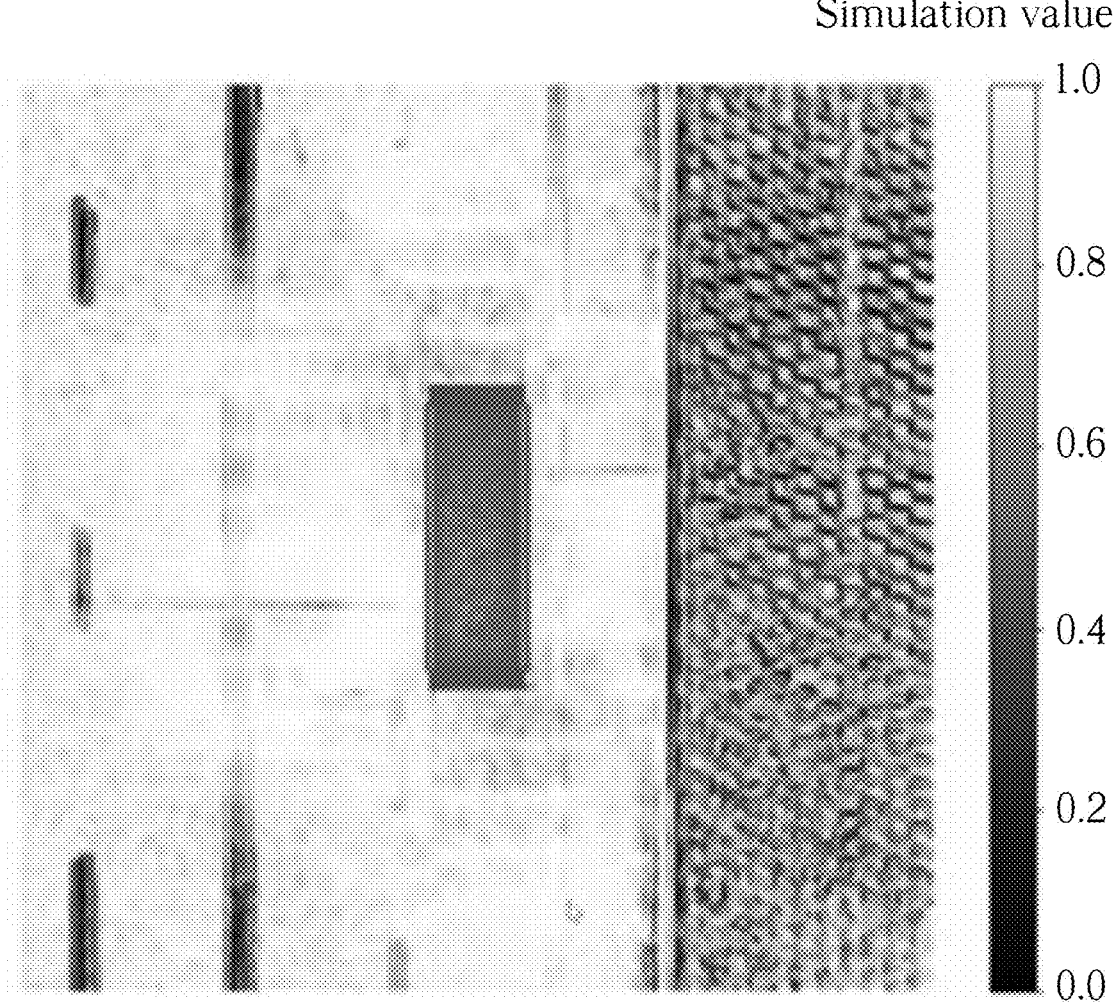
FIG. 6

PANORAMA CAMERA CONFIGURATION METHOD AND PANORAMA CAMERA CONFIGURATION SYSTEM

BACKGROUND OF THE INVENTION

1. Field of the Invention

The present invention relates to a panorama camera configuration method and a panorama camera configuration system, and more particularly, to a panorama camera configuration method and a panorama camera configuration system utilizing a three-dimensional simulation software to simulate configuration parameters.

2. Description of the Prior Art

The rapid development of computer systems has provided powerful tools for image processing, so algorithms for splicing or merging multiple images into a panoramic image have become very common. However, during the development process of new vehicles, engineers need to wait for a prototype of new vehicles to be completed before engineers can splice or merge the environmental images captured by multiple cameras into a panoramic image, and thereby adjust the installation position and number of cameras. In addition, if the test results show that the design of the new vehicle needs to be modified, the development process of the new vehicle will be time-consuming and increase material costs. Under this circumstance, how to simplify the development process of new vehicles has become a goal of the industry.

SUMMARY OF THE INVENTION

Therefore, the present invention is to provide a panorama camera configuration method and a panorama camera configuration system to improve the development process of the new vehicle.

The embodiment of the present invention discloses a panoramic camera configuration method, for a vehicle configured with a plurality of cameras. The panoramic camera configuration method includes obtaining a plurality of configuration parameters of the vehicle and a plurality of camera parameters of the plurality of cameras; utilizing a three-dimensional simulation software to establish a virtual environment image according to a plurality of environmental parameters of an environment around the vehicle; utilizing the three-dimensional simulation software to obtain a plurality of environment images corresponding to the plurality of cameras according to the virtual environment image, the plurality of environmental parameters, the plurality of configuration parameters and the plurality of camera parameters; utilizing the three-dimensional simulation software to obtain a panoramic image according to the plurality of environment images; and updating the plurality of configuration parameters and the plurality of camera parameters according to the virtual environment image and the panoramic image; wherein the plurality of environmental parameters includes a weather condition or a reflective condition, the three-dimensional simulation software is a game engine software, and the plurality of configuration parameters includes a vehicle position or a vehicle size corresponding to the virtual environment image.

The embodiment of the present invention discloses a panoramic camera configuration system, for a vehicle configured with a plurality of cameras. The panoramic camera configuration system includes a processor; and a memory, configured to store a program code, wherein the program code instructs the processor to perform a panorama camera configuration method, and the panoramic camera configuration method comprises: obtaining a plurality of configuration parameters of the vehicle and a plurality of camera parameters of the plurality of cameras; utilizing a three-dimensional simulation software to establish a virtual environment image according to a plurality of environmental parameters of an environment around the vehicle; utilizing the three-dimensional simulation software to obtain a plurality of environment images corresponding to the plurality of cameras according to the virtual environment image, the plurality of environmental parameters, the plurality of configuration parameters and the plurality of camera parameters; utilizing the three-dimensional simulation software to obtain a panoramic image according to the plurality of environment images; and updating the plurality of configuration parameters and the plurality of camera parameters according to the virtual environment image and the panoramic image; wherein the plurality of environmental parameters includes a weather condition or a reflective condition, the three-dimensional simulation software is a game engine software, and the plurality of configuration parameters includes a vehicle position or a vehicle size corresponding to the virtual environment image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flow chart of a panoramic camera configuration method according to an embodiment of the present invention.

FIG. 6 is a schematic diagram of a simulation result according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
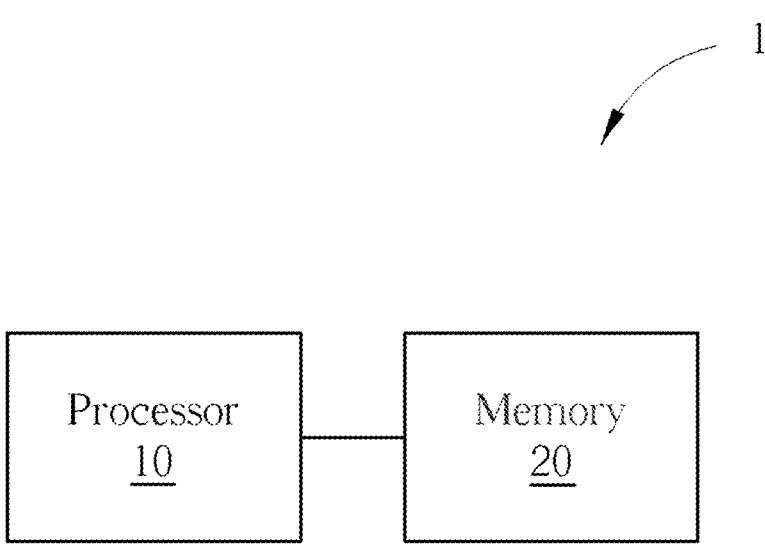
FIG. 1 is a schematic diagram of a panoramic camera configuration system according to an embodiment of the present invention.

Please refer to FIG. 1. FIG. 1 is a schematic diagram of a panoramic camera configuration system 1 according to an embodiment of the present invention. The panoramic camera configuration system 1 includes a processor 10 and a memory 20 coupled to each other. The memory 20 is configured to store a program code which instructs the processor 10 to perform a panoramic camera configuration method to virtualize a vehicle configured with a plurality of cameras and an environment around the vehicle, and simulate an optimal configuration of the plurality of cameras on the vehicle. Compared to the conventional method, the panoramic camera configuration method may simplify the development process of the vehicle configured with the plurality of cameras. It should be noted that the panoramic camera configuration system 1 represents the necessary components required to the panoramic camera configuration method, and its basic structure is well known in the art, and will not be narrated for brevity. Those skilled in the art may add other components as needed, such as the motherboard, the power supply, the cable, the input devices, etc., but not limited thereto, or may implement the panoramic camera configuration system 1 with appropriate devices or equipment.

The panoramic camera configuration method executed by the panoramic camera configuration system 1 may be summarized as a process 2, as shown in FIG. 2. The process 2 includes the following steps:

Step S200: Start.

Step S202: Obtain a plurality of configuration parameters of the vehicle and the plurality of camera parameters of the plurality of cameras.

Step S204: Utilize a three-dimensional simulation software to establish a virtual environment image, according to a plurality of environmental parameters around the vehicle.

Step S206: Utilize the three-dimensional simulation software to obtain a plurality of environment images corresponding to the plurality of cameras according to the virtual environment image, the plurality of environmental parameters, the plurality of configuration parameters and the plurality of camera parameters.

Step S208: Utilize the three-dimensional simulation software to obtain a panoramic image according to the plurality of environment images.

Step S210: Update the plurality of configuration parameters and the plurality of camera parameters according to the virtual environment image and the panoramic image.

Step S212: End.

According to the process 2, in step S202, the panoramic camera configuration system 1 obtains the plurality of configuration parameters of the vehicle and the plurality of camera parameters of the plurality of cameras. For example, users may input the plurality of configuration parameters of the vehicle and the plurality of camera parameters of the plurality of cameras through a user interface of the panoramic camera configuration system 1. Alternatively, the panoramic camera configuration system 1 utilizes the three-dimensional simulation software to generate the plurality of configuration parameters of the vehicle and the plurality of camera parameters of the plurality of cameras. It should be noted that the plurality of configuration parameters of the vehicle may include a length, a width and a height of the vehicle, but is not limited thereto. The plurality of cameras may include a panorama camera, an omnidirectional camera or a fisheye camera, but are not limited thereto. The plurality of camera parameters may include a camera focal length, a camera number and a camera position for each camera, but is not limited thereto.

Figure 3:
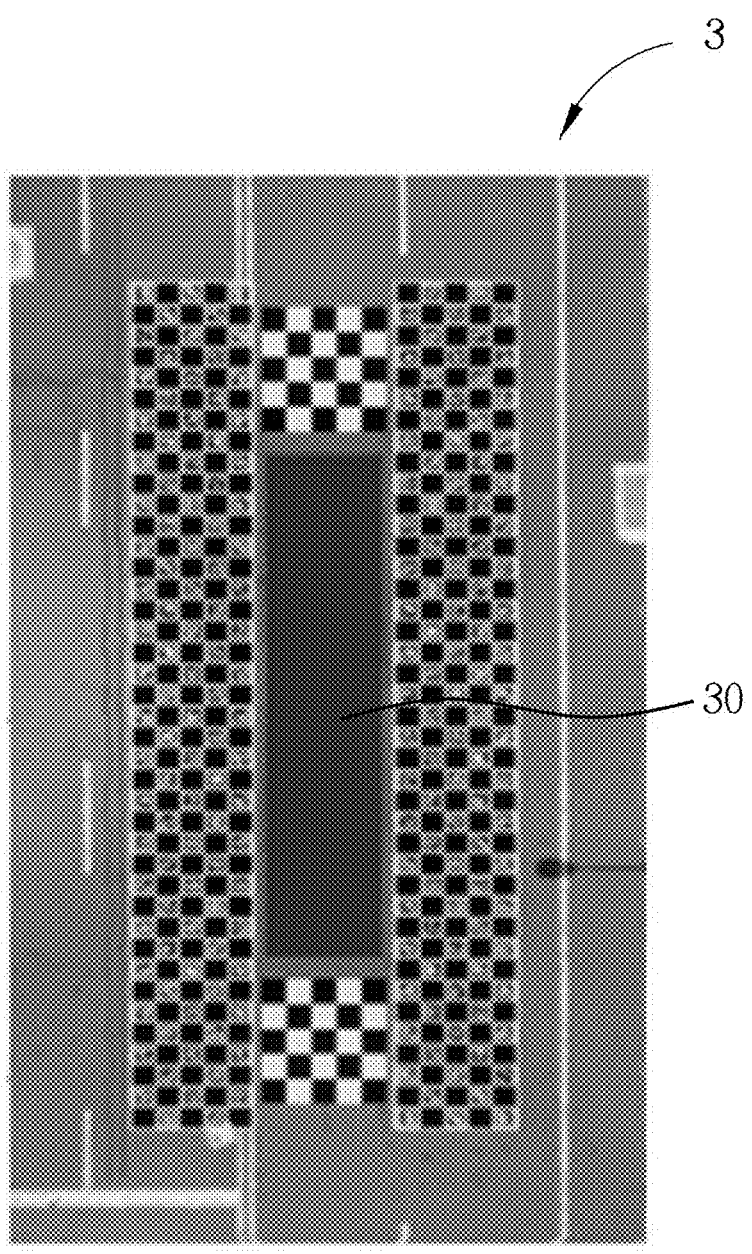
FIG. 3 is a schematic diagram of a virtual environment image according to an embodiment of the present invention.

It should be noted that the three-dimensional simulation software may be a game engine software such as Unreal® or Unity® game engine software, but are not limited thereto. The game engine software may be utilized to develop two-dimensional or three-dimensional game and support a personal computer, a mobile device, a game consoles, a web platform, an augmented reality and a virtual reality. In step S204, the panoramic camera configuration system 1 utilizes the game engine software to establish the virtual environment image according to the plurality of environmental parameters around the vehicle. The plurality of environmental parameters may include a weather condition and a reflective condition, but are not limited thereto. Please refer to FIG. 3. FIG. 3 is a schematic diagram of a virtual environment image 3 according to an embodiment of the present invention. As shown in FIG. 3, a virtual vehicle 30 is located in the virtual environment image 3. It should be noted that the plurality of configuration parameters further include a vehicle position or a vehicle size corresponding to the virtual environment image, but are not limited thereto.

Figure 4:
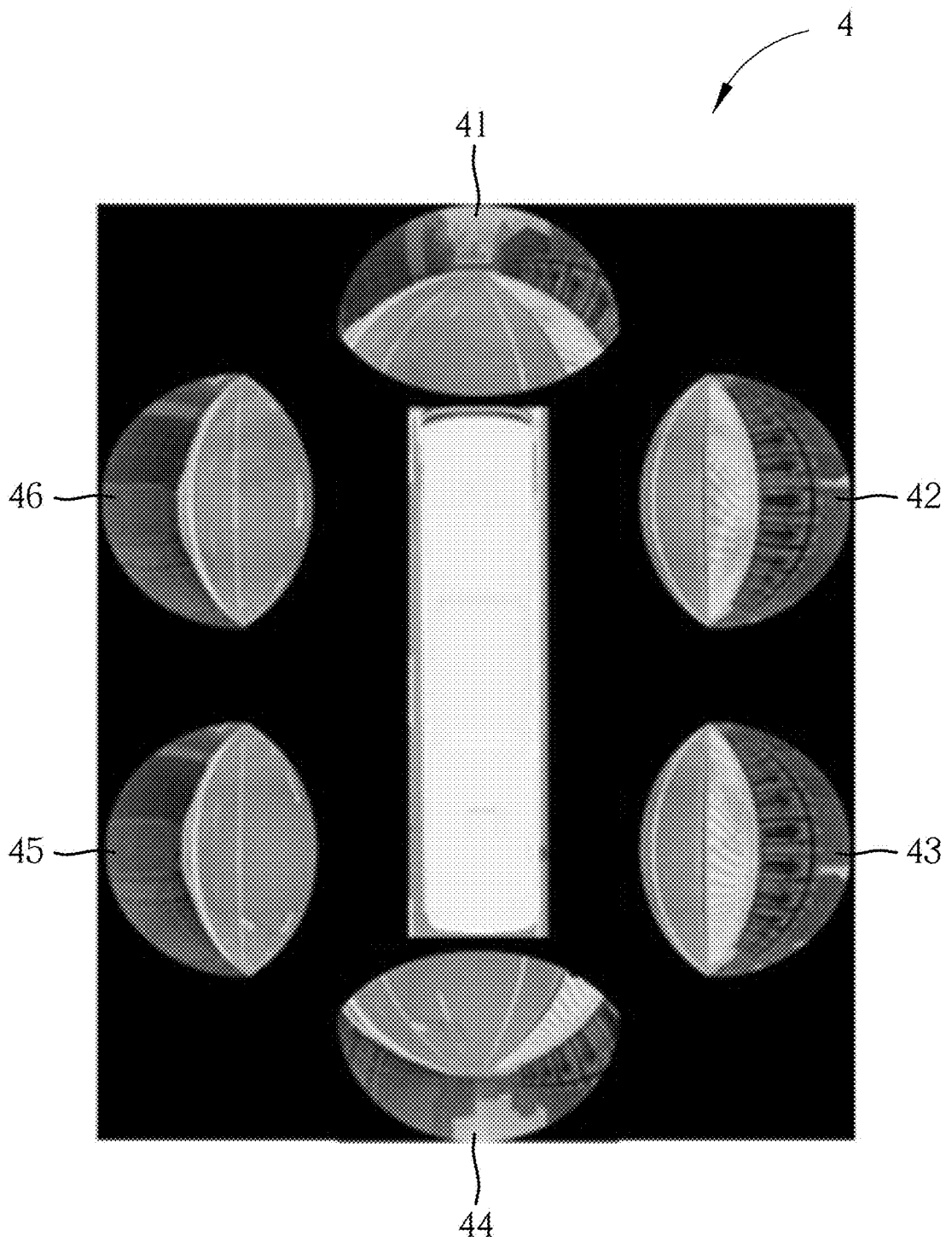
FIG. 4 is schematic diagrams of the plurality of environment images according to an embodiment of the present invention.
Figure 5:
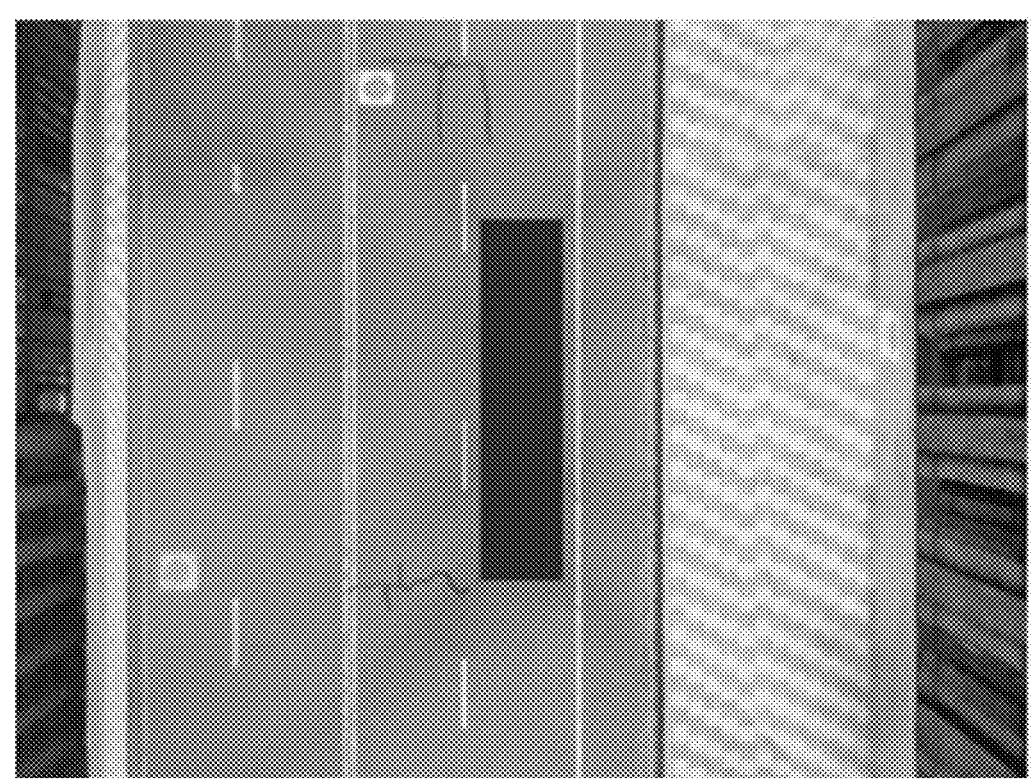
FIG. 5 is a schematic diagram of a panoramic image according to an embodiment of the present invention.

In step S206, the panoramic camera configuration system 1 utilizes the game engine software to obtain the plurality of environment images corresponding to the plurality of cameras according to the virtual environment image, the plurality of environmental parameters, the plurality of configuration parameters and the plurality of camera parameters. Please refer to FIG. 4. FIG. 4 is a schematic diagram of a plurality of environment images 41-46 corresponding to a plurality of cameras according to an embodiment of the present invention. As shown in FIG. 4, the plurality of environment images 41-46 are respectively partial images corresponding to the environment around the virtual vehicle 30. In step S208, the panoramic camera configuration system 1 utilizes the game engine software to splice or merge the plurality of environment images 41-46 into the panoramic image 5 shown in FIG. 5.

Please refer to FIG. 6. FIG. 6 is a schematic diagram of a simulation result 6 of the virtual environment image 3 and the panoramic image 5 according to an embodiment of the present invention. In step S210, the panoramic camera configuration system 1 generates the simulation result 6 according to the virtual environment image 3 and the panoramic image 5. As shown in FIG. 6, the simulation result 6 may show whether the environment around the virtual vehicle 30 may be identified by the plurality of cameras. For example, the simulation value close to 1 (light color) means that the environment may be clearly identified by the corresponding camera. On the contrary, the simulation value close to 0 (dark color) means that the environment may not be clearly identified by the corresponding camera. In this way, users may update the plurality of configuration parameters and the plurality of camera parameters according to the simulation result 6. In addition, the panoramic camera configuration system 1 may re-execute the panoramic camera configuration method to simulate the optimal configuration of the plurality of cameras on the vehicle according to the updated plurality of configuration parameters and the updated plurality of camera parameters.

It should be noted that the panoramic camera configuration system 1 is an embodiment of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the panoramic camera configuration system 1. Any of the abovementioned procedures and examples above may be compiled into program codes or instructions that are stored in the memory 20. The memory 20 may include read-only memory (ROM), flash memory, random access memory (RAM), subscriber identity module (SIM), hard disk, floppy diskette, or CD-ROM/DVD-ROM/BD-ROM, but not limited thereto. The processor 10 may read and execute the program codes or the instructions stored in the memory 20 for realizing the abovementioned functions.

In summary, compared to the prior art, the panoramic camera configuration system of the present invention utilizes the three-dimensional simulation software to establish the virtual vehicle, the plurality of virtual cameras and the corresponding virtual environment, and simulates the optimal configuration of the plurality of virtual cameras on the vehicle. In this way, the present invention not only simplifies the development process of the vehicle configured with multiple cameras, but also reduces the cost of physical prototype vehicles and cameras.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A panoramic camera configuration method, for a vehicle configured with a plurality of cameras, comprising:
   obtaining a plurality of configuration parameters of the vehicle and a plurality of camera parameters of the plurality of cameras;
   utilizing a three-dimensional simulation software to establish a virtual environment image according to a plurality of environmental parameters of an environment around the vehicle;
   utilizing the three-dimensional simulation software to obtain a plurality of environment images corresponding to the plurality of cameras according to the virtual environment image, the plurality of environmental parameters, the plurality of configuration parameters and the plurality of camera parameters;
   utilizing the three-dimensional simulation software to obtain a panoramic image according to the plurality of environment images; and
   updating the plurality of configuration parameters and the plurality of camera parameters according to the virtual environment image and the panoramic image;
   wherein the plurality of environmental parameters includes a weather condition or a reflective condition, the three-dimensional simulation software is a game engine software, and the plurality of configuration parameters includes a vehicle position or a vehicle size corresponding to the virtual environment image.

2. The panoramic camera configuration method of claim 1, wherein the plurality of camera parameters comprises the plurality of cameras being a panorama camera, an omnidirectional camera or a fisheye camera.

3. The panoramic camera configuration method of claim 2, wherein the plurality of configuration parameters comprises a camera number and a camera position.

4. The panoramic camera configuration method of claim 1, wherein the game engine software is Unreal® or Unity®.

5. A panoramic camera configuration system, for a vehicle configured with a plurality of cameras, comprising:
   a processor; and
   a memory, configured to store a program code, wherein the program code instructs the processor to perform a panorama camera configuration method, and the panoramic camera configuration method comprises:
      obtaining a plurality of configuration parameters of the vehicle and a plurality of camera parameters of the plurality of cameras;
      utilizing a three-dimensional simulation software to establish a virtual environment image according to a plurality of environmental parameters of an environment around the vehicle;
      utilizing the three-dimensional simulation software to obtain a plurality of environment images corresponding to the plurality of cameras according to the virtual environment image, the plurality of environmental parameters, the plurality of configuration parameters and the plurality of camera parameters;
      utilizing the three-dimensional simulation software to obtain a panoramic image according to the plurality of environment images; and
      updating the plurality of configuration parameters and the plurality of camera parameters according to the virtual environment image and the panoramic image;
      wherein the plurality of environmental parameters includes a weather condition or a reflective condition, the three-dimensional simulation software is a game engine software, and the plurality of configuration parameters includes a vehicle position or a vehicle size corresponding to the virtual environment image.

6. The panoramic camera configuration system of claim 5, wherein the plurality of camera parameters comprises the plurality of cameras being a panorama camera, an omnidirectional camera or a fisheye camera.

7. The panoramic camera configuration system of claim 6, wherein the plurality of configuration parameters comprises a camera number and a camera position.

8. The panoramic camera configuration system of claim 5, wherein the game engine software is Unreal® or Unity®.

* * * * *